United States Patent [19]

Kemr et al.

[11] 4,329,271
[45] May 11, 1982

[54] FLEXIBLE CERAMIC TAPE AND METHOD OF MAKING SAME

[75] Inventors: Miro Kemr, San Francisco; Howard Mizuhara, San Mateo, both of Calif.

[73] Assignee: GTE Products Corporation, Stamford, Conn.

[21] Appl. No.: 216,240

[22] Filed: Dec. 15, 1980

[51] Int. Cl.³ .......................... C08K 5/05; C08K 5/13
[52] U.S. Cl. .................................. 524/386; 524/430; 524/556
[58] Field of Search ...................... 260/33.4 R, 42.11

[56] References Cited

U.S. PATENT DOCUMENTS

| | | | |
|---|---|---|---|
| 2,765,507 | 10/1956 | Wolf et al. | 260/42.11 |
| 2,853,461 | 9/1958 | Padbury et al. | 260/42.11 |
| 3,991,029 | 11/1976 | Adelman | 260/42.11 |

Primary Examiner—Joseph L. Schofer
Assistant Examiner—N. Sarofim
Attorney, Agent, or Firm—John F. Lawler

[57] ABSTRACT

An improved flexible ceramic tape consists essentially of ceramic powder and a water soluble binder of polyacrylic acid polymer and glycerol. Additions of small amounts of polyvinyl pyrrolidine to this binder improves the flexibility of the resulting tape. The ceramic powder consists of alumina. The invention also comprehends the method of making this tape consisting of the steps of preparing a slip or mixture of an aqueous solution of polyacrylic acid polymer and glycerol together with the ceramic powder, casting this slip on a substrate to a predetermined uniform thickness, and drying the mixture. The tape may be removed from the substrate or allowed to remain mounted on it.

4 Claims, No Drawings

FLEXIBLE CERAMIC TAPE AND METHOD OF MAKING SAME

BACKGROUND OF THE INVENTION

This invention relates to an improved flexible ceramic tape and method of making same.

The advantage and utility of flexible ceramic tapes are in part measured by the organic content of the binder which holds the ceramic powder together. Prior practice in the ceramic tape industry has been to use polyvinyl butyral as a binder, dioctyl phthalate as a plasticizer and solvents such as the hydrocarbons xylene and toluene and other organic material such as trichlorethylene and alcohol. The difficulty with this prior art practice is that the toxic nature of the solvents requires special solvent scrubber apparatus to prevent the vapor from being expelled into the atmosphere during the drying process. In addition, since these solvents are petroleum derivatives, the price of the solvent has been increasing and its availability is not always assured.

Other tape binder systems used in the past include polyvinyl alcohol with plasticizers such as glycerine, polyethylene glycol and ethylene glycol but the total organic content of such binders including the plasticizer range from 20% to 25% of ceramic dry weight. Because of the high volume to weight ratio of the polyvinyl alcohol in such systems, control of the tape preparation process during the burnout period is very critical, the high organic content tending to produce uncontrolled release of gases which adversely affects the structure and quality of the tape.

This invention is directed to a ceramic tape composition and a method of manufacturing it which avoid the foregoing problems.

A general object of this invention is the provision of a flexible ceramic tape which contains a relatively low proportion of organic components.

A further object is the provision of a method of making flexible ceramic tape using a water soluble binder having a relatively low quantity of organic components.

These and other objects of the invention are achieved with a binder consisting of, in dry weight, 2-4% polyacrylic acid polymer, 9-14% glycerol and the balance a ceramic consisting of alumina. The invention also comprehends the method of making the flexible ceramic tape.

In accordance with this invention flexible ceramic tape is made with polyacrylic acid polymer having a molecular weight of approximately 450,000 in combination with glycerol and, optionally, polyvinyl pyrrolidine, and mixed with a ceramic powder consisting of alumina.

A preferred composition of a flexible ceramic tape consists of, in dry weight, 3% polyacrylic acid polymer, 12.5% glycerol and the balance alumina. Satisfactory results are obtained with the tape having, in dry weight, 2-4% polyacrylic acid polymer, 9-14% glycerol and the balance alumina.

The flexible tape and its binder system were evaluated by mixing a fixed quantity of ceramic powder with each of several binder systems having different proportions of ingredients. The mix was milled for 20 hours and cast from a dispenser with a 0.065" knife opening onto a substrate consisting of Mylar film. The wet tape was then dried at 90° C. for 1 hour and thereafter punched into a square sheet measuring $3\frac{7}{8}'' \times 3\frac{7}{8}'' \times 0.038''$ thick which was air fired at 1575° C. for 3 hours. After firing, the tape sheet had dimensions of $3\frac{1}{4}'' \times 3\frac{1}{4}'' \times 0.033''$ thick and a density of 3.70 g/cc.

Alumina was used in these tests and had a composition consisting of the following (in percent by weight):

66.9 reactive alumina, average particle size $1.7\mu$
28.6 reactive alumina, average particle size $0.7\mu$
3.5 talc (magnesium silicate)
1.0 refined clay The binder system with which the alumina was mixed consisted of, in dry weight, 0.25% of a deflocculating agent (sold as Darvan C by R. T. Vanderbilt Co., New York), 22% water, 0.01% of a dispersant (sold as Dispex A-40 made by Allied Colloid Co., Yorkshire, England, X% of polyacrylic acid polymer having a molecular weight of about 450,000 (sold as Carbopol 907 by B. F. Goodrich Co., Ohio) and Y% glycerol, with X being 2-4 and Y being 9-14. The molecular weight is determined by the intrinsic viscosity method.

Flexibility of green tape varied somewhat with variations in ingredients as described in Table I.

TABLE I

| Glycerol | Carbopol 907 | | |
|---|---|---|---|
| | 2% | 3% | 4% |
| 10 | Moderately brittle tape | Moderately brittle tape | Moderately stiff |
| 11 | Moderately brittle tape | Good Tape slightly brittle | Slightly stiff |
| 12.5 | Soft tape and short* | Good tape, slightly soft | Moderately stiff |
| 15 | Tacky | Tacky | Tacky |

*Tends to crumble

While tacky tape is generally not as desirable as non-tacky tape, the former may be used with utility and advantage in the formation of multilayer substrate.

Tape produced in accordance with this invention and sintered had an excellent finish, in the range of 15–20μ in. (measured in accordance with the procedure described in USA Standard B46-1962), was satisfactorily flat (2–3 mils per inch) and dense, had no bubbles or blisters and was almost porefree.

Further tests of the mixture containing, in dry weight, 3% polyacrylic acid polymer, 12.5% glycerol, and balance alumina were made by the addition of 0–5% polyvinyl pyrrolidine (PVP) sold as K-60 by GAF Corporation, New York. The effect of such PVP additions on tape characteristics are listed in Table II.

TABLE II

| % BY WEIGHT | |
|---|---|
| 0.5 | No noticeable improvement |
| 1.0 | Improved flexibility |
| 1.5 | Improved flexibility |
| 2.5 | No greater improvement |
| 3.0 | No greater improvement |

What is claimed is:

1. A flexible ceramic composition consisting, in dry weight, of 2-4% polyacrylic acid polymer having a molecular weight of approximately 450,000, 9-14% glycerol and the balance a ceramic substance consisting of alumina.

2. A flexible ceramic composition consisting, in dry weight, of 2-4% polyacrylic acid polymer having a molecular weight of approximately 450,000, 9-14% glycerol, 0.5–2% polyvinyl pyrrolidine, and the balance alumina.

3. The method of preparing a flexible ceramic tape consisting of the steps of preparing a mixture consisting of an aqueous solution of, in dry weight, 2% to 4% polyacrylic acid polymer having a molecular weight of approximately 450,000 and 9% to 14% glycerol and the balance alumina powder, casting said mixture to a uniform thickness on a substrate, and drying said mixture.

4. The method of preparing a flexible ceramic tape consisting of the steps of preparing a mixture consisting of an aqueous solution of, in dry weight, 2% to 4% polyacrylic acid polymer having a molecular weight of approximately 450,000 and 9% to 14% glycerol and 0.5% to 2.0% polyvinyl pyrrolidine and the balance alumina powder, casting said mixture to a uniform thickness on a substrate, and drying said mixture.

* * * * *